United States Patent [19]
Lewis et al.

[11] Patent Number: 6,103,847
[45] Date of Patent: Aug. 15, 2000

[54] SILOXANE-POLYETHER COPOLYMERS WITH UNSATURATED FUNCTIONALITIES, AND PROCESS FOR MAKING THEM

[75] Inventors: Kenrick M. Lewis, New York; Hua Yu, White Plains, both of N.Y.

[73] Assignee: Witco Corporation, Greenwich, Conn.

[21] Appl. No.: 09/082,563

[22] Filed: May 21, 1998

Related U.S. Application Data

[60] Provisional application No. 60/047,719, May 27, 1997.

[51] Int. Cl.$^7$ ..................................................... C08G 77/06
[52] U.S. Cl. ................................................ 528/21; 528/18
[58] Field of Search ......................................... 528/21, 18

[56] References Cited

U.S. PATENT DOCUMENTS

| | | |
|---|---|---|
| 3,299,112 | 1/1967 | Bailey . |
| 4,259,467 | 3/1981 | Keogh et al. . |
| 4,260,725 | 4/1981 | Keogh et al. . |
| 4,657,959 | 4/1987 | Bryan et al. . |
| 4,752,633 | 6/1988 | Aasen et al. . |
| 4,847,398 | 7/1989 | Mehta et al. . |
| 4,857,583 | 8/1989 | Austin et al. . |
| 5,159,096 | 10/1992 | Austin et al. . |
| 5,191,103 | 3/1993 | Mehta et al. . |
| 5,565,194 | 10/1996 | Burkhart et al. ........................... 528/15 |
| 5,580,921 | 12/1996 | Stepp et al. . |

OTHER PUBLICATIONS

Noll, *Chemistry and Technology of Silicones*, Silicones, 446–453, Ch. 9, *Chemistry and Technology of Silicones* (1968).

Chang, P. et al., Synthesis of Cyclo(dimethylSiloxane Co–methylhydrogensiloxane), Polymer Preprints, vol. 33, No. 2 (Aug., 1992).

Aoki et al., *Poly(divinylsiloxyethylene glycol)—synthesis and photoresist characteristics*, J. Macromol. Rapid Commun. 18, 31–36 (1997).

*Primary Examiner*—Melvyn I. Marquis
*Attorney, Agent, or Firm*—Edward K. Welch, II; Andrew S. Reiskind; Timothy X. Witkowski

[57] ABSTRACT

This invention discloses hydrophilic additives in polysiloxane gels, elastomers and coatings, and novel processes for producing them. The process comprises:

(a) redistributing into polysiloxane-polyether copolymers an unsaturated silane or siloxane, (b) adding to the mixture of reagents a catalytically effective amount of a basic catalyst; and (c) heating the reaction mixture to effect reaction.

Novel siloxane structures of unsaturated aliphatic modified polyether siloxane copolymers are also taught.

9 Claims, No Drawings

6,103,847

SILOXANE-POLYETHER COPOLYMERS WITH UNSATURATED FUNCTIONALITIES, AND PROCESS FOR MAKING THEM

This application claims benefit of provisional application 60/047,719, filed May 27, 1997.

FIELD OF THE INVENTION

The present invention relates to siloxane-polyether compositions with unsaturated functionalities, such as alkenyl and alkynyl groups, which are capable of being hydrosilylated. These compositions are useful as hydrophilic additives for addition-cure polysiloxane gels, elastomers and coatings.

BACKGROUND OF THE INVENTION

Siloxane-polyether copolymers may be linear, branched, hydrolyzable or nonhydrolyzable structures. U.S. Pat. Nos. 4,657,959 and 4,752,633 disclose their use as semipermanent hydrophilic additives in dental impressions.

Polydiorganosiloxane having terminal or pendant unsaturated hydrocarbon groups are known. Typical examples are the linear polydimethylsiloxanes having a vinyl group attached to the silicon atom at each terminus of the chains, and the linear polydimethylsiloxanes with vinyl groups randomly distributed on silicon atoms in the chains. Polysiloxane-polyether copolymers bearing terminal methacrylate groups impart durable hydrophilicity to the contact lens compositions of U.S. Pat. Nos. 4,259,467 and 4,260,725. Aoki, et al., *Macromolecules, Rapid Communications*, 18 (1997) 31–36, synthesized hydrolyzable siloxane-polyether copolymers of general formula, $[(R'_2SiO)—(C_2H_4O)_7]_{20-35}$, wherein R'=vinyl. While all of these functionalized polysiloxane-polyether copolymers can be reacted into polymer matrices or onto surfaces to improve hydrophilicity, water absorption, lubricity and/or adhesion, the reactions do not result in the formation of Si—C bonds between the matrix or substrate and the functionalized polysiloxane-polyether. Si—C bonds are desirable because they are strong and nonhydrolyzable.

U.S. Pat. No. 5,580,921 discloses storage-stable polysiloxane compositions which impart permanent hydrophilicity to addition cure dental impression compounds. Permanent hydrophilicity is provided by polysiloxane-polyether copolymers which have 10–400 silicon atoms per molecule, which contain unsaturated functionalities and which are free of noble metal catalysts. The copolymers become bound to the polysiloxane matrix by Si—C bonds during the curing step. Synthesis of the copolymers comprises the preparation of a distillable silane-polyether compound followed by its hydrolysis, condensation and equilibration with alkenyl siloxanes. The copolymer chain lengths are greater than 10 and are miscible with the α, ω-divinylpolysiloxanes used in addition cure formulations. This feature facilitates storage stability of the two part formulations and avoids the need to use the copolymer as a separate component. However, the copolymers of long siloxane chain length do not afford the most rapid spreading of water and wetting of the cured polysiloxane surface.

BRIEF SUMMARY OF THE INVENTION

Accordingly, the instant invention discloses noble metal-containing, unsaturated siloxane-polyether copolymer compositions synthesized by the base-catalyzed equilibration of unsaturated silanes and siloxanes with saturated siloxane-polyether copolymers or ring opening of cyclic siloxane polyether copolymers with unsaturated siloxanes. Base-catalyzed equilibration of an alkenyl silane or siloxane with siloxane-polyether copolymer products affords unsaturated siloxane-polyether copolymers which impart permanent hydrophilicity to addition cure polysiloxane compositions, as well as to polyethylene, polypropylene and polyester matrices. Besides the hydrophilic modifiers, the equilibration reaction mixtures also contain polyethers and noble metal catalyst residues.

DETAILED DESCRIPTION OF THE INVENTION

It is an object of the instant invention to provide unsaturated, nonhydrolyzable siloxane-polyether copolymers that are capable of forming further Si—C bonds via hydrosilylation. Another object of the instant invention is the provision of unsaturated siloxane-polyether copolymers useful as hydrophilic modifiers in polysiloxane, polyethylene, polypropylene, polyester and other thermoplastic substrates. A still further object is control of the content of unsaturated groups in the hydrophilic modifier so that both desirable hydrophilicity and optimum catalysis (cure time and working time) are realized in addition cure polysiloxane compositions. Another aspect of the invention is products of the following reaction, particularly those products in which there are up to nine silicon atoms present. In nonhydrolyzable siloxane-polyether copolymers, the polyether and siloxane segments are linked by Si—C bonds, which are resistant to cleavage under aqueous acidic and alkaline conditions.

Process

A method for the synthesis of the said unsaturated polysiloxane-polyether copolymers of controlled unsaturation content includes the following steps:

(a) combining polysiloxane-polyether copolymers and an alkenyl or alkynyl silane or siloxane, or an, capable of undergoing addition or redistribution reactions with the copolymers in an amount sufficient to achieve the desirable degree of alkenyl or alkynyl substitution to form a first mixture, (b) adding to the first mixture of reagents a catalytically effective amount of a basic catalyst to form a reaction mixture; and (c) heating the reaction mixture.

Preferably there is also a purification step to remove by-products and catalyst.

The polysiloxane-polyether copolymer may be obtained, for example by hydrosilylation as described in U.S. Pat. Nos. 3,299,112, 4,847,398, 4,857,583, 5,191,103 or 5,159,096, all of which are incorporated herein by reference, or from commercial sources. The copolymer can contain bound and free platinum, unreacted polyether and reaction byproducts such as acetals and propanal. The copolymer may be cyclic, linear, or branched (in either T or Q formation). The exact structure of the copolymers for use herein will depend on the desired end structures, examples of which are set forth below.

The copolymer may be represented by the formula

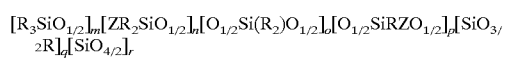

wherein

R is a $C_1$–$C_{20}$, preferably $C_1$–$C_{12}$, saturated, monovalent organic group. Illustrative of the saturated monovalent groups represented by R are the alkyl groups (for example, methyl, ethyl, isopropyl, octyl and dodecyl groups), the aryl groups (for example, the phenyl and naphthyl groups), the alkaryl groups (for example, tolyl and nonylphenyl groups), the aralkyl groups (for example, benzyl and phenethyl groups) and the cycloalkyl groups (for example, cyclopentyl and cyclohexyl groups). R may also be a functionalized organic group such as the chloropropyl, heptafluoroisopropyl, and cyanoethyl groups. Most preferably R is methyl.

Z is a polyether-containing group that is linked to the polysiloxane block by a silicon-carbon bond. Z has general formulae of the type, $-C_xH_{2x}O(C_aH_{2a}O)_bR''$ and $-C_xH_{2x}OG[(C_aH_{2a}O)_bR'']_r$ wherein x is an integer in the range 1–20, and is preferably 2–8. The subscript, a, is an integer having a value greater than or equal to 2. Preferred values of a are 2, 3, and 4. Illustrative of the oxyalkylene groups in the polyether portion of the copolymer are the oxyethylene, the oxy-1,2-propylene, oxy-1,2-butylene, oxy-2,2-dimethyl-1,3-propylene groups and the like. The polyether portion of the copolymer may contain oxyalkylene units of more than one type. For optimum hydrophilicity, it is desirable that at least 40 weight percent, and preferably at least 70 weight percent, of the oxyalkylene groups be oxyethylene groups. The subscript, b, is a positive number that is preferably greater than 3 up to 12.

G is a polyhydroxy group capable of being alkoxylated. The subscript, r, represents the number of alkoxylated hydroxyl groups. Examples of G are alkylene glycols, alkyne glycols, glycerol, pentaerythritol, hydroquinone, trimethylolpropane, sorbitol, glucose and sucrose.

R" is hydrogen or a polyether capping group such as an alkyl group of 1–8 carbon atoms, or an acyl group of 1–8 carbon atoms, or a vinyl ether or an organosilyl group. Alkyl groups exemplifying R" are methyl, tertiary butyl and 2-ethylhexyl. Examples of acyl capping groups are acetoxy, acetoacetoxy, acryloxy, methacryloxy and benzoyl. Organosilyl capping groups comprise the saturated trialkylsilyl groups such as trimethylsilyl, triethyl, ethylisopropyl, thexyldimethyl, t-butyldimethyl, t-butyldiphenyl, the unsaturated capping groups such as the vinyldimethyl, divinyloctyl, ethynyldimethyl and propynyldimethyl. Examples of vinyl ether end groups comprise dihydropyranyl and vinyloxyethoxy ($H_2C=CH-O-CH_2CH_2O-$). Owing to the variable efficiency of polyether capping reactions, uncapped polyether molecules are likely to be present during the hydrosilylation synthesis of the polysiloxane-polyether copolymer starting material. Accordingly, nominally capped copolymer products may also contain uncapped polysiloxane-polyether copolymers.

m=0 to 5, preferably 0 to 2; n=0 to 3; preferably 0; o=0 to 100, preferably 0 to 50; p=0 to 30; preferably 0 to 10; q=0 to 4; r=0 to 2. If p=0, then n>0 and if n=0, then p=0. m+n+o+p+q+r=3 to 100, preferably 3 to 50.

The copolymer is reacted with linear and/or cyclic siloxanes and silanes bearing non-aromatic unsaturated groups bonded to silicon through an Si—C bond so that either a redistribution of saturated and unsaturated groups occurs, or siloxane segments bearing unsaturated groups become incorporated into the polysiloxane blocks of the polysiloxane-polyether copolymers. If ethylenic, the unsaturation is $\alpha,\beta$, while if the unsaturation is acetylenic, it may be internal to the unsaturated substituent. The unsaturated group may be terminal or internal to the siloxane. The silanes may be represented by the formula $R_aR^1_bSi(OR)_{4-a-b}$ with a=1 to 3, b=1 to 3 and a+b$\leq$=3. The siloxanes may be of the structure of the siloxane above, except that Z is replaced with $R^1$. $R^1$ is a $C_1$–$C_{20}$, preferably $C_1$–$C_{12}$, unsaturated monovalent organic group that can be hydrosilylated to yield silicon-carbon bonds. Illustrative of the unsaturated groups represented by $R^1$ are the alkenyl groups (for example, vinyl, allyl, methallyl, vinylcyclohexanyl), and, the alkynyl groups (for example, acetylenic and propargyl). Specific examples of the siloxane/silane are $[H_2C=CHSi(CH_3)_2]_2O$ or $[H_2C=CHSi(CH_3)O]_{3-25}$, or $(H_2C=CH)_xSi[OSi(CH_3)_3]_{4-x}$, $(H_2C=CH)_xSi(OC_2H_4OCH_3)_{4-x}$, x=1, 2, or 3).

Equations (1–3) exemplify the chemical transformations expected.

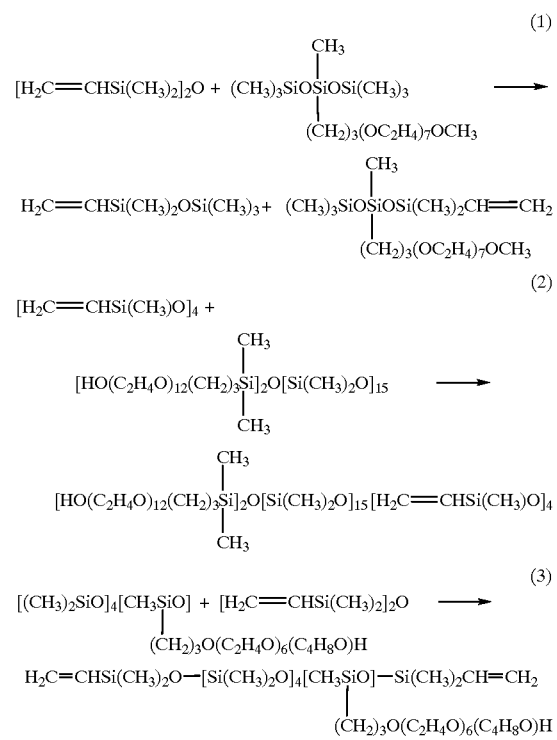

Redistribution is accomplished in the presence of basic catalysts such as KOH, CsOH, Ca(OH)$_2$, $(CH_3)_4N^{+-}OSi(CH_3)_3$, $(CH_3)_4N^{+-}[OSi(CH_3)_2]_sO^{-+}N(CH_3)_4$ (s=4–100) and $K^{+-}OSi(CH_3)_3$ at temperatures up to about 200° C., preferably up to about 150° C. Catalysts containing the tetramethyl ammonium cation, or another tetra alkyl ammonium cation, are preferred because they are readily destroyed by heat at the end of the reaction. The reaction mixture may be stripped in vacuo to remove unreacted alkenyl siloxane and volatile by-products of the thermal decomposition such as trimethylamine and redistribution by-products such as $(CH_3)_3SiOH$, $(CH_3)_3SiOSi(CH_3)_3$ and $H_2C=CHSi(CH_3)_2OSi(CH_3)_3$. Neutralization with $(CH_3)_3SiCl$ or with strong acid (for example, HCl) is preferred when catalysts containing the alkali or alkaline earth metals are used. Thereafter, the reaction mixture is subjected to filtration and in vacuo stripping of volatiles. The base should be present at a catalytically effective amount, which generally is 0.05 wt % to 5 wt %, preferably 0.1 wt % to 1 wt %.

The stoichiometric ratio of unsaturated siloxane to polysiloxane-polyether copolymer during the equilibration or ring opening covers the broad range, 0.05–20, but is preferably 0.5–4 and most preferably 0.75–3. When a cyclic polysiloxane-polyether copolymer is used (as shown in Equation 3 above), the stoichiometric ratio is desirably 1–2. It is not necessary that every molecule of unsaturated siloxane-polyether copolymer be at least doubly substituted with hydrosilylatable alkenyl or alkynyl groups. It is only necessary that sufficient molecules be at least singly substituted so that they become bound to the matrix or substrate requiring permanent hydrophilicity. Thus, the addition reaction depicted in equation (3) can be done with mixtures of $[(CH_3)_3Si]_2O$ and $[H_2C=CHSi(CH_3)_2]_2O$ to control the vinyl content of the product. In some instances, a high content of unsaturation can lead to inhibition of cure when the unsaturated polysiloxane-polyether copolymer is used in addition cure polysiloxane formulations. That the reaction product contains hydrosilylatable unsaturated groups bound to silicon can be established and quantified by spectroscopic measurements, particularly $^{13}C$ and $^{29}Si$ nuclear magnetic resonance. These unsaturated groups are distinguishable from others such as allyl and propenyl, which are associated with unreacted polyether.

A preferred process is one wherein the starting siloxane-polyether copolymer is cyclic (m, n, q, and r are all 0] which is ring opened with a disiloxane of the structure $R^1R_2SiOSiR_2R^1$ or $R_3SiOSiR_2R^1$ (preferably, the former) with R and $R^1$ as above.

Structure

Unsaturated siloxane-polyether copolymers are the principal products of the two step synthesis. The remainder of the reaction mixture comprises saturated siloxane-polyether copolymers, unreacted polyethers such as allyl, propenyl, methallyl, vinyl and propargyl polyethers, and free and/or chemically bound platinum. If the composition is prepared with uncapped polyethers, some of the copolymers and polyethers might be linked by acetal groups. The presence of acetals is not detrimental to the performance of the reaction product as a hydrophilic additive, but it is preferable to remove same. The platinum content of the unsaturated polysiloxane-polyether product can be in the range 0.5–100 ppm, but is typically 5–50 ppm.

The compositions comprise unsaturated polysiloxane-polyether copolymers having general formulae and polymer architectures set forth hereinbelow.

Linear (A) $R^1-SiR_2O(SiR_2-O)_n-(SiR^2Z-O)_m-SiR_2R^1$
(B) $R^1-SiR_2O(SiR_2-O)_n-(SiR^2Z-O)_m-SiR_3$
(C) $R_3SiO(SiR_2-O)_n-(SiR^2Z-O)_m-(SiR^2R^1-O)_p-SiR_3$
(D) $R^1-R_2SiO(SiR_2-O)_n-(SiR^2Z-O)_m-(SiR^2R^1-O)_p-SiR_3$
(E) $R^1-R_2SiO(SiR_2-O)_n-(SiR^2Z-O)_m-(SiR^2R^1-O)_p-SiR_2R^1$
(F) $Z-SiR_2O(SiR_2-O)_n-(SiR^2R^1-O)_p-SiR_2R^1$
(G) $[Z-SiR_2O(SiR_2-O)_n]_q-(SiR_2-O)-(SiR^2R^1-O)_p-SiR_2R^1$ Cyclic (H) $(R_2Si-O)_n-(SiR^2Z-O)_m-(SiR^2R^1-O)_p$ Branched (I) $R^1Si[(O-SiR_2)_n-Z]_3$
(J) $RSi[(O-SiR^2R^1)_p-(O-SiR_2)_n-Z]_3$
(K) $[R^1SiR_2O(SiR_2-O)_n]_v-(SiO_2)[(O-SiR^2R^1)_p(O-SiR_2Z)_m]_{4-v}$ R, $R^1$ and Z are as above. The groups $R^2$ may be the same as R or as $R^1$. Thus, for example, they provide for the presence of methyl and vinyl groups on the same silicon atom, or for the existence of geminal divinyl substitution.

The subscript, n, has a value of 0 to 100, and preferably 0 to 50 inclusive. The subscript, m, is greater than zero, but less than 50 and is preferably 1 to 12 in value. The subscript, p, has a value of 0 to 25 and is preferably 1 to 6. The subscript, q, is 1 up to about 100 and is preferably 10 to 50. The subscript, v, has values of 0 to 3.

One preferred embodiment of the invention is compounds of any of the foregoing formulas (A) through (K), and particularly (A) through (G), wherein the total number of silicon atoms in the molecule is 3 to 5, i.e., $R^2R_2SiO(SiR_2O)_n(SiR^2ZO)_m(SiR^2R^1O)_pSiR_2R^2$ wherein +m+p=0 to 3, each n. m, and p are 0 to 3, with the proviso that there is at least one Z and at least one $R^2$ per molecule and $R^2$ is R, $R^1$ or Z. Even more preferably, this a vinyl endblocked siloxane, with p=0 and R is methyl.

Specific examples of the inventive structures are in the following figures.

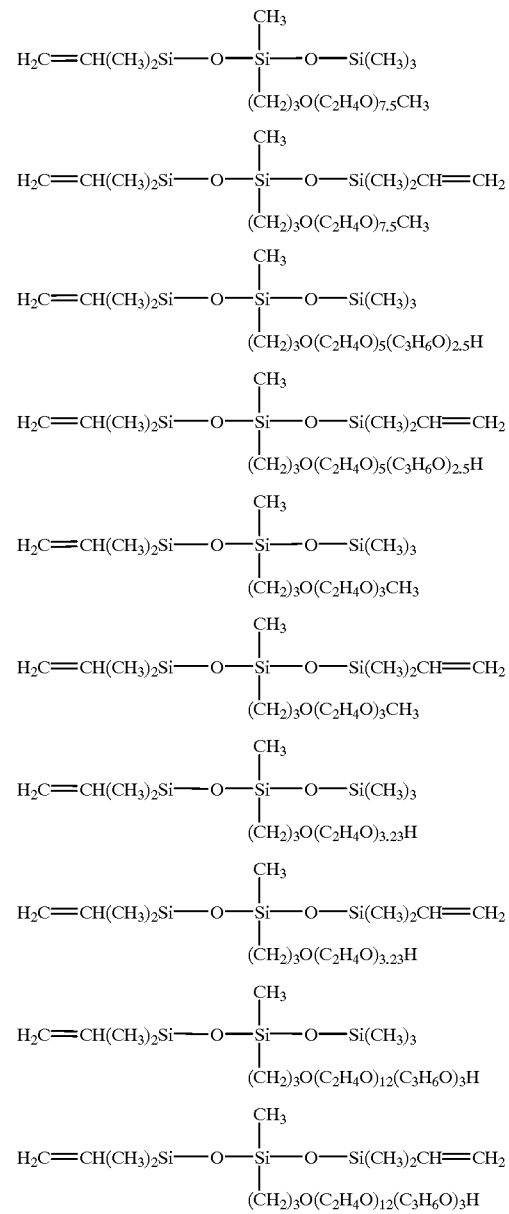

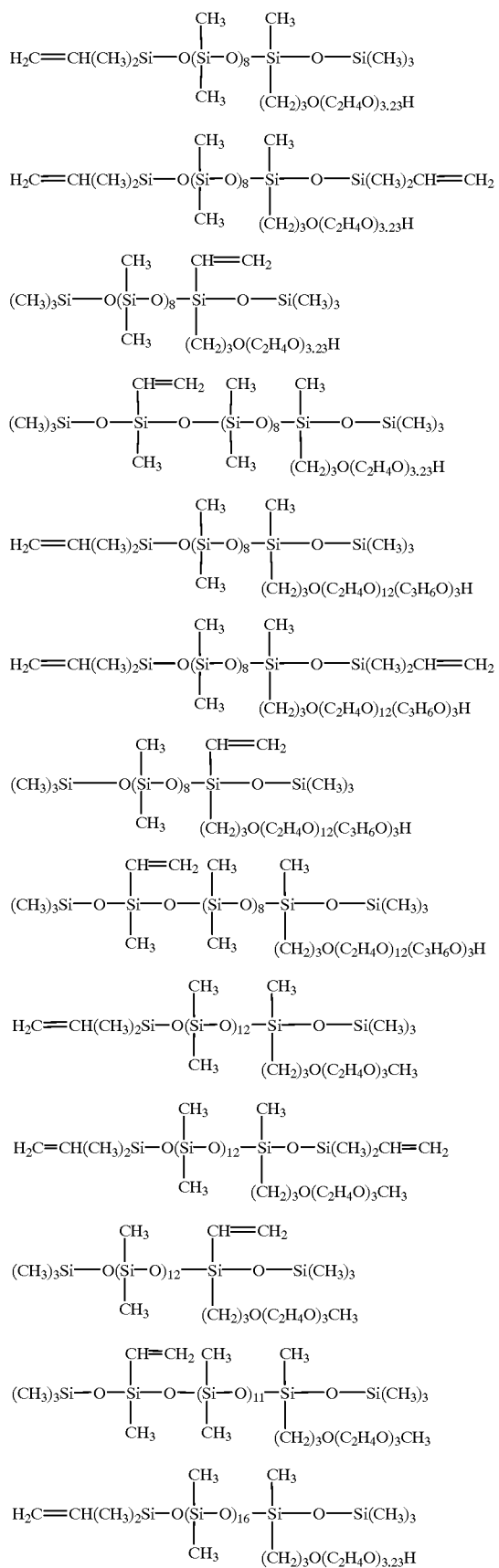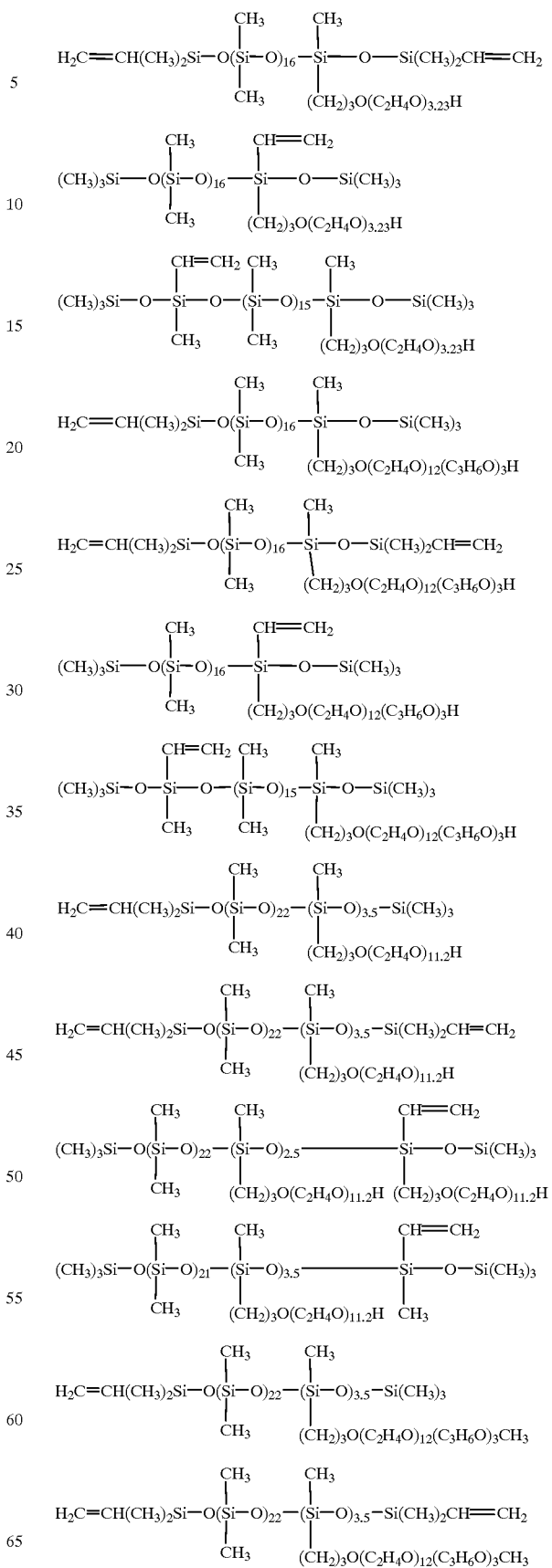

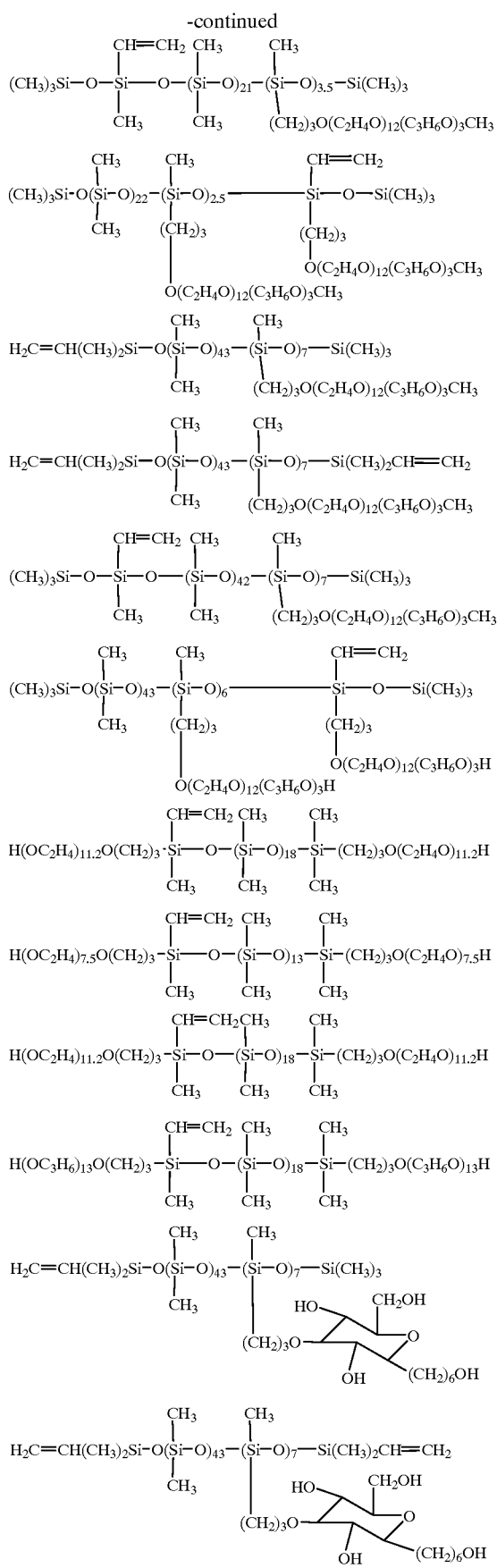

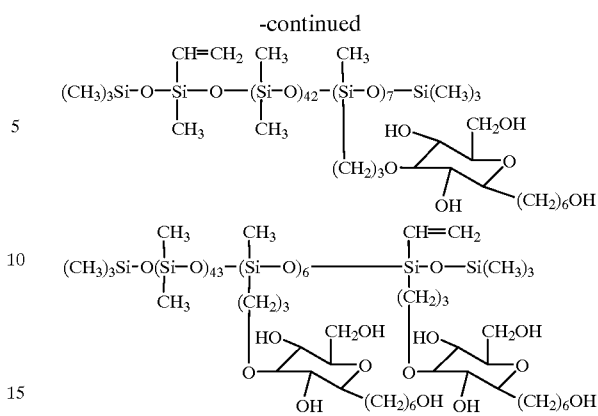

Hydrophilicity may be determined by measuring the contact angle of a water drop on the surface of interest (see W. Noll, *Chemistry and Technology of Silicones,* Academic Press, NY, 1968, pp 447–452). A value less than about 60° after 2—3 minutes wetting time denotes a hydrophilic surface. It is known in the art that unmodified polysiloxane surfaces are very hydrophobic and yield water contact angles greater than about 80°. Commercially available hydrophilic dental impression materials yield values in the range, 40–60°. However, these hydrophilic values increase to the hydrophobic range following washing and/or disinfection of the dental impression. The unsaturated polysiloxane-polyether copolymers of the instant invention confer permanent hydrophilicity characterized by water contact angles that are less than about 50° before and after washing and/or disinfection.

The contact angle is a thermodynamic quantity and should have a unique value for a particular system under special conditions. However, hysteresis is often found in contact angle measurements depending on the direction of movement of the interface relative to its interacting surface. When an interface advances along a fresh surface, the advancing contact angle (typically designated $\theta_A$) is larger than the receding contact angle (typically designated $\theta_R$). In general $\theta_A \geq \theta \geq \theta_R$. Advancing and receding angles may differ by as much as 60°. $\theta_A$ for water in contact with silicones is greater than 120°. For measurements made on fresh surfaces under dynamic conditions, hydrophilicity is indicated by $\theta_A$ less than about 100°.

EXAMPLES

The following illustrative examples describe the instant invention in more detail. They are not intended to limit the scope of the specification and the claims. Abbreviations used in the description of the illustrative examples are defined in the following table.

| ABBREV. | MEANING | ABBREV. | MEANING |
|---|---|---|---|
| M | $(CH_3)_3SiO_{1/2}$ | ICP | inductively coupled plasma spectroscopy |
| D | $(CH_3)_2SiO_{2/2}$ | gpc | gel permeation chromatography |
| D' | $CH_3SiHO_{2/2}$ | $\theta$ | water contact angle |
| M' | $(CH_3)_2SiHO_{1/2}$ | gc/ms | gas chromatography/ mass spectrometry |
| M* | $H_2C=CH(CH_3)_2SiO_{1/2}$ | MVC | mixture of cyclic methylvinyl-siloxanes |

-continued

| ABBREV. | MEANING | ABBREV. | MEANING |
|---------|---------|---------|---------|
| EO | ethylene oxide | ICP | inductively coupled plasma spectroscopy |
| PO | propylene oxide | gc | gas chromatography |
| BO | butylene oxide | | |

Materials

Trimethylsiloxy terminated polysiloxane-polyether copolymers shown in Table 1 were prepared by hydrosilylation using the procedures of the patents cited in the table.

TABLE 1

POLYSILOXANE - POLYETHER COPOLYMERS USED AS STARTING MATERIALS

| PRODUCT | SILOXANE BACKBONE | POLYETHER | SYNTHESIS METHOD |
|---------|-------------------|-----------|------------------|
| A | MD'M | $H_2C=CHCH_2(EO)_{7.5}OCH_3$ | U.S. 3,299,112 |
| B | MD'M | $H_2C=CHCH_2(EO)_{5.5}(PO)_{2.8}OH$ | U.S. 5,191,103 |
| C | $MD_4D'M$ | $H_2C=CHCH_2(EO)_{3.23}OCH_3$ | U.S. 4,847,398 |
| D | $MD_8D'M$ | $H_2C=CHCH_2(EO)_{3.23}OH$ | U.S. 5,191,103 |
| E | $MD_8D'M$ | $H_2C=CHCH_2(EO)_3OCH_3$ | U.S. 3,507,815 |
| F | $MD_8D'M$ | $H_2C=CHCH_2(EO)_{12}(PO)_3OH$ | U.S. 5,191,103 |
| G | $MD_{12}D'M$ | $H_2C=CHCH_2(EO)_{3.23}OH$ | U.S. 4,847,398 |
| H | $MD_{12}D'M$ | $H_2C=CHCH_2(EO)_3OCH_3$ | U.S. 3,507,815 |
| I | $MD_{12}D'M$ | $H_2C=CHCH_2(EO)_{12}(PO)_3OH$ | U.S. 5,191,103 |
| J | $MD_{16}D'M$ | $H_2C=CHCH_2(EO)_{3.23}OH$ | U.S. 5,191,103 |
| K | $MD_{16}D'M$ | $H_2C=CHCH_2(EO)_3OCH_3$ | U.S. 3,507,815 |
| L | $MD_{16}D'M$ | $H_2C=CHCH_2(EO)_{12}(PO)_3OH$ | U.S. 5,191,103 |
| M | $D_4D'$ | $H_2C=CHCH_2(EO)_{7.5}OCH_3$ | U.S. 3,507,815 |
| N | $D_4D'$ | $H_2C=CHCH_2(EO)_{5.5}(PO)_{2.8}OH$ | U.S. 5,191,103 |

1,3-Divinyltetramethyldisiloxane (M*M*) was purchased from Gelest, Inc. A methylvinylcyclosiloxane mixture, $[H_2C=CH(CH_3)SiO]_p$, p=3 (4.3 wt %), p=4 (76.54 wt %), p =5 (17.68 wt %), p=6 (1.4 wt %) was prepared by hydrolysis of $H_2C=CH(CH_3)SiCl_2$. Cyclo(dimethylsiloxane-co-methylhydrogenosiloxanes) of the type $D_nD'_m$ (n=1–5, m=1–4, n+m<8) were prepared by the acid-catalyzed equilibration of polydimethylsiloxanes and polymethylhydrogensiloxanes as described by Chang and Buese in *Polymer Preprints,* 33 (1992) 160–161.

SILWET® L-77 is a siloxane-polyether copolymer with terminal trimethylsiloxy groups.

V-2K is an α, ω-divinylpolydimethylsiloxane having 0.22 wt % vinyl and a viscosity of 2000 cSt at 25° C.

V-200 is a α, ω-divinylpolydimethylsiloxane with 0.7 wt % vinyl and a viscosity of 200 cSt at 25° C.

V-XL is a crosslinker with SiH content 40 cc $H_2$/g

VCAT-RT is a platinum complex of 1,3-divinyltetramethyldisiloxane dissolved in 500 cSt silicone oil. Its Pt content is ~2 wt %.

SILWET® L-77, V-2K, V-200, V-XL and VCAT-RT are products of Witco Corp.

BANICIDE®, a glutaraldeyhde-based, sterilizing disinfectant manufactured by Pascal Co. Inc., was used as the disinfecting medium in accordance with the manufacturer's instructions. Disinfection time was overnight (~16 hr) in most cases and in others as long as 64 hr. Commercial dental impression formulations were mixed and cured as directed in the manufacturer's product literature.

$(CH_3)_4N^{+-}OSi(CH_3)_2[OSi(CH_3)_2]_{58}Si(CH_3)_2O^{-+}N(CH_3)_4$ (N-CAT) was prepared by charging 216 g $[(CH_3)_2SiO]_4$, 18.1 g $(CH_3)_4NOH.5H_2O$ and 250 g toluene to three-neck 1 L round bottom flask fitted with a temperature-controlled heating mantle, mechanical stirrer, Claisen connection, water cooled Friedrich condenser, thermometer, and vacuum take-off line. The mixture was heated to 65–70° C. at 100–200 torr to remove the water-toluene azeotrope. When no additional azeotrope distilled over the water and toluene were separated and the weight of water (~8 g) recorded. The vacuum was released, the temperature was lowered and another 100 g toluene added to the flask. Final stripping of residual water (~1 g) and all of the toluene was accomplished by heating to 90° C. at 50 torr. The product is a viscous, hygroscopic liquid.

General Synthesis Procedure

Equilibration and ring opening reactions were performed in a three-necked 500 mL round bottom flask fitted with a temperature-controlled heating mantle, mechanical stirrer, Claisen connection, water cooled Friedrich condenser, thermometer, and nitrogen sparge line. Weighed quantities of polysiloxane-polyether copolymer, vinylsiloxane and N-CAT were charged to the flask and the stirring contents heated to 90° C. for 4 hours. The temperature was then increased to 140° C. for 1 hour to decompose N-CAT and the reaction mixture was later stripped in vacuo at 100° C./4 torr for 4 hours. Condensate was collected, weighed and analyzed by gc and gc/ms. The stripped product was weighed and analyzed by $^{13}C$ and $^{29}Si$ nmr, gpc and ICP. It was used as a hydrophilic additive and as a silicone surfactant.

Evaluation of Hydrophilicity

Hydrophilicity was evaluated by measuring the water contact angle, as a function of time, on the surfaces of cured polysiloxane discs containing the unsaturated polysiloxane-polyether copolymers of this invention. Contact angles were also measured on control discs made without the inventive hydrophilic additives and on samples made from commercial compositions advertized as being hydrophilic. All measurements were made with a Rame-Hart goniometer (Model 100 00 115). Standard deviations of the measured angles were ±5°.

Dynamic contact angle measurements were made with a Cahn DCA-315 dynamic contact angle analyzer. The two part formulation was mixed and applied to the glass plate of the analyzer. Measurements were taken while the formulation was curing. Calculation of the advancing and receding contact angles were made automatically by the analyzer software.

Examples 1–14

Examples 1–14 illustrate the synthesis of vinyl-containing polysiloxane-polyether copolymers by the general procedure described above. Reaction stoichiometry was varied as shown in Table 2 using the quantities of saturated polysiloxane-polyether copolymers of Table 1 and 1,3-divinyltetramethyldisiloxane (M*M*). All reactions were run at 85–90° C./4 hr prior to catalyst decomposition and separation of volatiles.

TABLE 2

SYNTHESIS OF VINYL-CONTAINING POLYSILOXANE - POLYETHER COPOLYMERS

| EXAMPLE | Copolymer, g (see Table 1) | MM, g | N-CAT, g | STRIPPED PRODUCT, g |
|---|---|---|---|---|
| 1 | A, 120.9 | 36 | 0.5 | 112 |
| 2 | B, 132.6 | 36 | 0.5 | 124 |
| 3 | C, 67.7 | 17.5 | 0.1 | 64.2 |
| 4 | D, 82 | 15 | 0.1 | 83.5 |
| 5 | E, 85 | 15 | 0.1 | 83.2 |
| 6 | F, 53 | 10 | 0.1 | 55.1 |
| 7 | G, 53 | 12 | 0.1 | 55.4 |
| 8 | H, 55 | 12 | 0.1 | 57.2 |
| 9 | I, 63 | 10 | 0.1 | 68.4 |
| 10 | J, 86.5 | 10 | 0.1 | 92.1 |
| 11 | K, 51.2 | 6 | 0.1 | 52.2 |
| 12 | L, 50 | 4.3 | 0.1 | 52.5 |
| 13 | M, 98.4 | 24 | 0.4 | 96.5 |
| 14 | N, 98.6 | 21 | 0.4 | 100.2 |

The reaction products varied in color from colorless to yellow to dark brown.

Example 15

This example illustrates the composition of the unsaturated polysiloxane-polyether copolymers of synthesized in Examples 1, 2, 13 and 14. The platinum content of the products was analyzed by ICP and found to be 10–40 ppm as shown below.

TABLE 3

| EXAMPLE | Pt, ppm |
|---|---|
| 1 | 15 |
| 2 | 10 |
| 13 | 37 |
| 14 | 30 |

$^{29}$Si and $^{13}$C nmr spectra of the reaction products of Examples 1 and 2 were recorded on a BRUCKER ACP-300 spectrometer. The molar ratio of vinyldimethylsilyl endgroups (M*) to trimethylsilyl endgroups (M) in the product of Example 1 was 0.32 and in Example 2 was 0.24. It is clear from these analytical data that not all of the $(CH_3)_3Si$ endgroups of the starting copolymer were converted to $H_2C=CHSi(CH_3)_2$ endgroups. For example in Copolymer M, the ratio of silicon bound methyls to $SiCH_3$ groups was 11.24, as compared to a theoretical value of 9.0. However, it will be illustrated below that the level of conversion realized was sufficient to impart permanent hydrophilicity to addition cure polysiloxane compositions.

Examples 16–24

This example illustrates the permanent hydrophilicity of selected unsaturated polysiloxane-polyether copolymers when they were incorporated into addition cure polysiloxane compositions. The unsaturated polysiloxane-polyether copolymers were tested in commercial two part dental formulations and in an unfilled formulation suitable for encapsulating electronic components or coating textiles and medical devices. Descriptions of the formulations and the quantities of hydrophilic additives used are given in Tables 4–6.

TABLE 4

LIST OF COMMERCIAL DENTAL IMPRESSION MATERIALS TESTED

| DENTAL FORMULATION | MANUFACTURER | DESCRIPTION |
|---|---|---|
| 3M EXPRESS ™ | 3M Dental Products | Type I impression putty material. Very high viscosity |
| Bisico S1a/S1b | Bisico | 72 Shore A impression putty material |
| Blu-Mousse | Parkell Biomaterials | Thixotropic impression material |
| J/P Q³ ™ Universal | Jeneric ®/Pentron ®, Inc | Type I high viscosity impression material |
| J/P CORRECT ™ VPS | Jeneric ®/Pentron ®, Inc. | Type III Light Extra, Light Viscosity |
| COMPARATIVE | | |
| Bisico S4i hydrophil | Bisico | Type I low viscosity, light body |
| IMPREGUM ® F | Espe | Type I polyether impression material |

TABLE 5

COMPOSITION OF UNFILLED FORMULATION

| INGREDIENT | PART A, wt % | PART B, wt % |
|---|---|---|
| V-2K | 86.8 | 91.53 |
| V-200 | — | 8.18 |
| V-XL | 13.2 | — |
| VCAT-RT | — | 0.12 |
| MVC | — | 0.17 |

The unfilled formulation of Table 5 was cured by mixing either equal weights of the two parts, or by mixing in the weight ratio 1.5 PART A to 1.0 PART B, pouring the mixture in a cylindrical mold and heating in an oven at 120° C. for 15–30 min. Water contact angles of the cured formulations with and without the hydrophilic, unsaturated polysiloxane-polyether copolymers were measured before and after disinfection of the cured discs. Comparisons were made with commercial hydrophilic dental formulations (Bisico S4i hydrophil and IMPREGUM® F).

TABLE 6

CONTACT ANGLE DATA FOR POLYSILOXANE COMPOSITIONS PREPARED WITH UNSATURATED POLYSILOXANE - POLYETHER COPOLYMERS AND FOR COMPARATIVE CONTROLS

| | Formulation (wt %) | | Additive | Additive | Contact Angle Before Disinfection | | Contact Angle After Disinfection | |
|---|---|---|---|---|---|---|---|---|
| Example | A Part | B Part | (Table 2) | (wt %) | 3 min | 10 min | 3 min | 10 min |
| Ex. 16 3M Express ™ | 49.4 | 49.4 | Ex. 2 | 1.2 | 15 | 12 | 25 | 15 |
| 3M CONTROL | 50 | 50 | none | — | 81 | 78 | 80 | 79 |
| Ex. 17 J/P Q³ ™ | 49.125 | 49.125 | Ex. 1 | 1.75 | 29 | 15 | 48 | 35 |
| Ex. 18 J/P Q³ ™ | 49.3 | 49.3 | Ex. 2 | 1.4 | 18 | 14 | 48 | 33 |
| J/P CONTROL | 50 | 50 | none | — | 86 | 85 | 86 | 86 |
| Ex. 19 Blu-Mousse | 49.75 | 49.75 | Ex. 1 | 0.5 | 24 | 17 | 32 | 18 |
| Blu-Mousse CONTROL | 50 | 50 | none | — | 84 | 83 | 85 | 84 |
| Ex. 20 Bisico S1a/S1b | 49.25 | 49.25 | Ex. 2 | 1.5 | 26 | 15 | 34 | 16 |
| Bisico CONTROL | 50 | 50 | none | — | 76 | 76 | 77 | 76 |
| Ex. 21 Unfilled | 59.55 | 39.7 | Ex. 2 | 0.75 | 13 | 10 | 16 | 12 |
| Ex. 22 Unfilled | 59.16 | 39.44 | Ex. 1 | 1.4 | 16 | 10 | 24 | 20 |
| Ex. 23 Unfilled | 55.7 | 37.12 | Ex. 8 | 7.2 | 38 | 25 | 50 | 28 |
| Unfilled CONTROL | 60 | 40 | none | — | 88 | 87 | 88 | 88 |
| Ex. 24 J/P CORRECT ™ | 49 | 49 | Ex. 1 | 2.0 | 23 | 11 | 27 | 15 |
| J/P CORRECT ™ CONTROL | 50 | 50 | none | — | 78 | 63 | 88 | 82 |
| Impregum ® F | 88.89 | 11.11 | — | — | 48 | 42 | 52 | 45 |
| Bisico S4i, hydrophilic wash | 50 | 50 | — | — | 64 | 58 | 75 | 68 |

Table 6 shows that IMPREGUM® F is permanently hydrophilic in that its 3 minute water contact angles are 48–52° before and after disinfection. However, the Bisico S4i hydrophilic wash and J/P CORRECT™ Type III Light Extra samples all showed post-infection increases in contact angles indicating loss of hydrophilicity. Contact angles increased to >60°. All of the control polysiloxane compositions were hydrophobic; they yielded 3 or 10 minute water contact angles that were greater than 75°. There was little change in the values following disinfection.

Addition of 1.2 wt % of the unsaturated copolymer of Example 2 to the 3M dental putty in Example 16 effected a lowering of contact angles to <20° before disinfection and to ≦25° afterwards. This dramatic and durable contact angle lowering compared to the control (~80°) was effected by unsaturated copolymer product containing 10 ppm Pt and the functional groups idenified by nmr spectroscopy in Table 3. The data confirm that the unsaturated polysiloxane-polyether copolymers in the product of Example 2 were permanently bonded to the cured matrix. Similar evidence for permanent hydrophilic modification with this product is seen in the data for J/P Q³ Universal (Ex. 18), for Bisico S1a/S1b (Ex. 20) and for the unfilled formulation (Ex. 21). The effective quantity of unsaturated polysiloxane-polyether copolymer employed in these Examples was 0.1–0.3 wt %.

0.5–2.0 wt % of the unsaturated polysiloxane-polyether copolymer product of Example 1 also imparted durable hydrophilicity to the commercial dental formulations in Examples 17, 19 and 24 and the unfilled formulation of Example 22. The effective quantity of unsaturated copolymer in these experiments was only 0.05–0.35 wt %. Thus, both the high efficacy and effectiveness of the inventive compositions in affording permanent hydrophilicity to polysiloxane compositions are established.

Examples 25–32

This example illustrates the durable hydrophilicity imparted to cured polysiloxane compositions by the unsaturated copolymers prepared in Examples 13 and 14.

The unfilled formulation of Table 5 was used in the weight ratio 1.5 PART A to 1.0 PART B. Use levels of the hydrophilic, unsaturated copolymers of Examples 13 and 14 were varied as shown in Table 7. Weight percent values shown are based on the total weight of PART A, PART B and hydrophilic additive in the experiment. Control samples without the hydrophilic additive were prepared and measured as a comparison.

Table 7 shows the 3 minute water contact angles on the cured elastomer before and after disinfection. Above 1.5 wt % use level of the hydrophilic additive of Example 13, there was no change in the contact angles after disinfection. For 0.6 wt % use level, the cured polysiloxane was still hydrophilic after disinfection, but the contact angle had increased from 13° to 49°. The hydrophilic additive of Example 14 gave similar results, except that no changes in contact angle were now observed above ~2 wt % use level.

TABLE 7

PERMANENT HYDROPHILICITY OF CURED POLYSILOXANES CONTAINING HYDROPHILIC ADDITIVES OF EXAMPLES 13 AND 14

| EXAMPLE | ADDITIVE | USE LEVEL, wt % | θ, BEFORE DIS-INFECTION | θ, AFTER DIS-INFECTION |
|---|---|---|---|---|
| 25 | Example 13 | 0.6 | 13° | 49° |
| 26 | | 1.5 | 12° | 13° |
| 27 | | 2.0 | 12° | 12° |
| 28 | | 3.0 | 11° | 12° |
| CONTROL | NONE | — | 84° | 85° |
| 29 | Example 14 | 0.5 | 32° | 63° |
| 30 | | 1.1 | 15° | 48° |
| 31 | | 2.2 | 14° | 15° |
| 32 | | 2.8 | 12° | 14° |
| CONTROL | NONE | — | 84° | 85° |

We claim:

1. A process for making a copolymer comprising
   (a) adding to a polysiloxane-polyether copolymer an alkenyl or alkynyl silane or siloxane capable of undergoing an addition or redistribution reaction with the polysiloxane-polyether (b) adding to the mixture formed in step (a) a catalytically effective amount of a basic catalyst; and (c) heating the mixture formed in step (b) to a temperature up to about 200° C., to effect reaction to form unsaturated polysiloxane-polyether copolymer product.

2. A process in accordance with claim 1 wherein said basic catalyst is selected from the group consisting of KOH, CsOH, Ca(OH)$_2$, (CH$_3$)$_4$N$^{+-}$OSi(CH$_3$)$_3$, (CH$_3$)$_4$N$^{+-}$[OSi(CH$_3$)$_2$]$_s^{-+}$N(CH$_3$)$_4$ (wherein s=4–100) and K$^{+-}$OSi(CH$_3$)$_3$.

3. A process according to claim 1 wherein the polysiloxane-polyether copolymer of step (a) is a cyclic structure which is ring opened with a disiloxane of the structure R$^1$R$_2$SiOSiR$_2$R$^1$ or R$_3$SiOSiR$_2$R$^1$ with R$^1$ is a C$_1$–C$_{20}$, unsaturated monovalent organic group that can be hydrosilylated to yield silicon-carbon bonds and R is a C$_1$–C$_{20}$ saturated, monovalent organic group.

4. A process according to claim 3 wherein R$^1$ is a vinyl group.

5. A process according to claim 1 wherein the polysiloxane-polyether copolymer of step (a) is of the formula [R$_3$SiO$_{1/2}$]$_m$[ZR$_2$SiO$_{1/2}$]$_n$[O$_{1/2}$Si(R$_2$)O$_{1/2}$]$_o$[O$_{1/2}$SiRZO$_{1/2}$]$_p$[SiO$_{3/2}$R]$_q$[SiO$_{4/2}$]$_r$ wherein R is a C$_1$–C$_{20}$, preferably C$_1$–C$_{12}$, saturated, monovalent organic group, Z is a polyether-containing group that is linked to the polysiloxane block by a silicon-carbon bond, m=0 to 5, n=0 to 3; o=0 to 100, p=0 to 30; q=0 to 4; r=0 to 2 and if p=0, then n>0 and if n=0, then p=0 and m+n+o+p+q+r=3 to 100.

6. A siloxane of the structure: R$^2$R$_2$SiO(SiR$_2$O)$_n$(SiR$^1$ZO)$_m$(SiR$^1$RO)$_p$SiR$_2$R$^2$ wherein n+m+p=0 to 3, each n, m, and p are 0 to 3, with the proviso that there is at least one Z and at least one R$^1$ per molecule and wherein R$^1$ is a C$_1$–C$_{20}$, unsaturated monovalent organic group that can be hydrosilylated to yield silicon-carbon bonds, R is a C$_1$–C$_{20}$ saturated, monovalent organic group; Z is a polyether-containing group that is linked to the polysiloxane block by a silicon-carbon bond and R$^2$ is selected from the group consisting of R, R$^1$ and Z.

7. A siloxane according to claim 6 wherein Z is C$_x$H$_{2x}$O(C$_a$H$_{2a}$O)$_b$R" or —C$_x$H$_{2x}$OG[(C$_a$H$_{2a}$O)$_b$R"]$_r$ wherein x is an integer in the range 1–20, G is a polyhydroxy group capable of being alkoxylated, a is 2 to 4, b=3 to 12, R" is hydrogen or a polyether capping group, and r, represents the number of alkoxylated hydroxyl groups on the G group.

8. A siloxane according to claim 7 wherein R$^2$ is vinyl and p=0.

9. A siloxane according to claim 8 wherein each R is methyl.

* * * * *